No. 657,732. Patented Sept. 11, 1900.
E. S. FRANCIS.
COUPLING FOR ELECTRIC CONDUITS.
(Application filed July 6, 1900.)

(No Model.)

Witnesses:
Wm. H. Barker.
Arthur B. Jenkins.

Inventor:
Edward S. Francis.
by Chas. L. Burdett
Attorney

UNITED STATES PATENT OFFICE.

EDWARD S. FRANCIS, OF HARTFORD, CONNECTICUT.

COUPLING FOR ELECTRIC CONDUITS.

SPECIFICATION forming part of Letters Patent No. 657,732, dated September 11, 1900.

Application filed July 6, 1900. Serial No. 22,736. (No model.)

*To all whom it may concern:*

Be it known that I, EDWARD S. FRANCIS, a citizen of the United States, and a resident of Hartford, in the county of Hartford and State of Connecticut, have invented certain new and useful Improvements in Couplings for Electric Conduits, of which the following is a specification.

My invention relates to the class of devices used for connecting electric conduits with a connection-box; and the object of my invention is to provide a device of this class that shall be simple, comparatively small, and compact for use in connecting or coupling a flexible conduit of peculiar construction to a connection-box.

Figure 1:
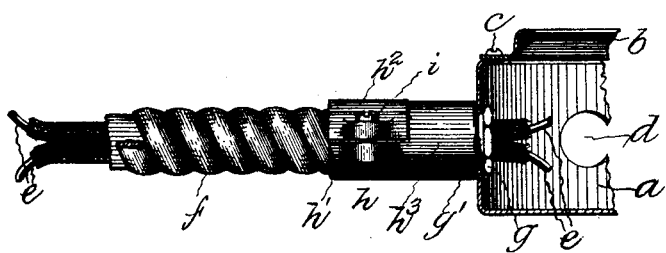
Figure 2:
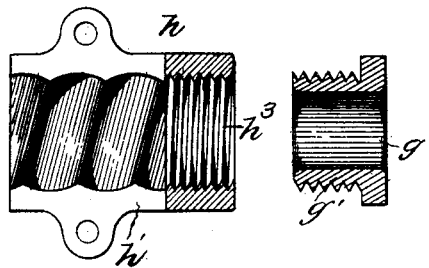
Figure 3:
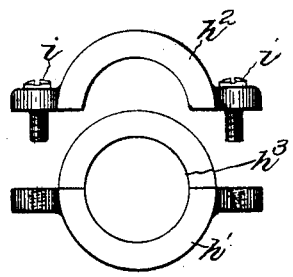

The preferred form of device embodying my invention is shown in the accompanying drawings, wherein—
Figure 1 is a view in side elevation of the coupling and of a conduit and in section of one side of a connection-box. Fig. 2 is a view, on enlarged scale, in horizontal section, through the coupling and the thimble. Fig. 3 is a view in end elevation of the coupling, showing the sections separated.

In the accompanying drawings the letter $a$ denotes a connection box of ordinary construction made usually of wrought metal, with a cover $b$ secured to the box, as by means of screws $c$, and having through the walls of the box openings $d$, through which a wire or group of wires $e$ may enter the box from a conduit $f$.
Prior forms of coupling devices for conduits have consisted of a cylindrical piece screw-threaded to receive a thread on the end of a tubular conduit and also to receive the threaded shank $g'$ of the tubular thimble $g$, the wall of the box at the edge of the opening being clamped between the end of the coupling and the flange on the nipple $g$. One form of flexible coupling in more or less extended use is made of metal, with an outer layer formed of a continuous strip wound spirally about the inner layers, the edges of the strip being quite close to each other. Such a flexible conduit is shown at $f$, and its outer surface presents practically a coarse thread rounded as to its surface. This form of conduit has on account of its peculiar characteristics both of construction and form been a difficult one to unite to a connection-box with any known form of coupling, and prior to my invention the devices for this purpose have been crude and bungling. My improved coupling $h$ is made in two sections $h'$ $h^2$ and is tubular in form, the line of division between the sections being in a plane about central lengthwise of the coupling until near one end, when the plane of division turns at an angle, and preferably at a right angle, to the lengthwise plane of division. This coupling has a solid portion near one end forming a complete circle or short tube, while the remainder of the coupling is divided, so that the part $h^2$ may be separated from the body of the coupling. The part $h^3$ is threaded to receive the threaded shank $g'$ of the nipple $g$, and the remainder of the coupling is formed on its inner surface to closely fit upon the outer surface of the flexible coupling.

The two sections of the coupling are united by means of bolts or screws $i$, which extend through registering projections from the sides of the two sections. The bolts $i$ extend through the projections on the one part into threaded sockets in the registering projections on the other section of the coupling, and by this means the two parts are clamped firmly together upon the end of the conduit. The nipple is used for fastening the coupling to the wall of the connection-box, which is, as stated, clamped between the end of the coupling and the shoulder formed by the flange on the nipple, the latter being shaped to receive a wrench or like means for turning it.

My improved coupling is of comparatively simple construction and forms a positive and compact means for securing the end of the flexible conduit to the connection-box.

It is obvious that the invention is not limited to the precise details of construction illustrated and described herein; but changes in such details are contemplated as within the scope of my invention.

What I claim as my invention, and desire to secure by Letters Patent, is—

1. In a coupling for connection-boxes, in combination, a main section tubular in form and threaded on the inner surface at one end and having a removable section less in length than the coupling and partible on about the central plane lengthwise of the coupling, and means for securing the two sections together and clamping them upon the end of the conduit.

2. The improved coupling having in combination a body part or main section with a tubular opening at one end having its inner walls threaded, a complementary removable section fitting the main section and registering parts with means for securing the sections together.

3. In combination, a coupling having a body part or main section with a tubular opening at one end having its inner walls threaded, a complementary removable section fitting the main section, means for securing the sections together, a nipple having a shoulder and threaded to fit the tubular opening in the main section of the coupling, and a flexible conduit having its outer wall formed of a series of spirally-arranged separate bands.

EDWARD S. FRANCIS.

Witnesses:
ARTHUR B. JENKINS,
ERMA P. COFFRIN.